Aug. 22, 1950     W. V. TEDRICK     2,519,942
ADJUSTABLE STOP ATTACHMENT FOR HEIGHT GAUGES
Filed Feb. 26, 1945
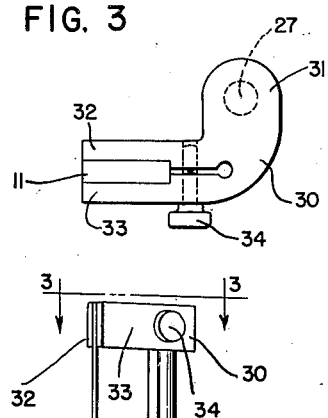
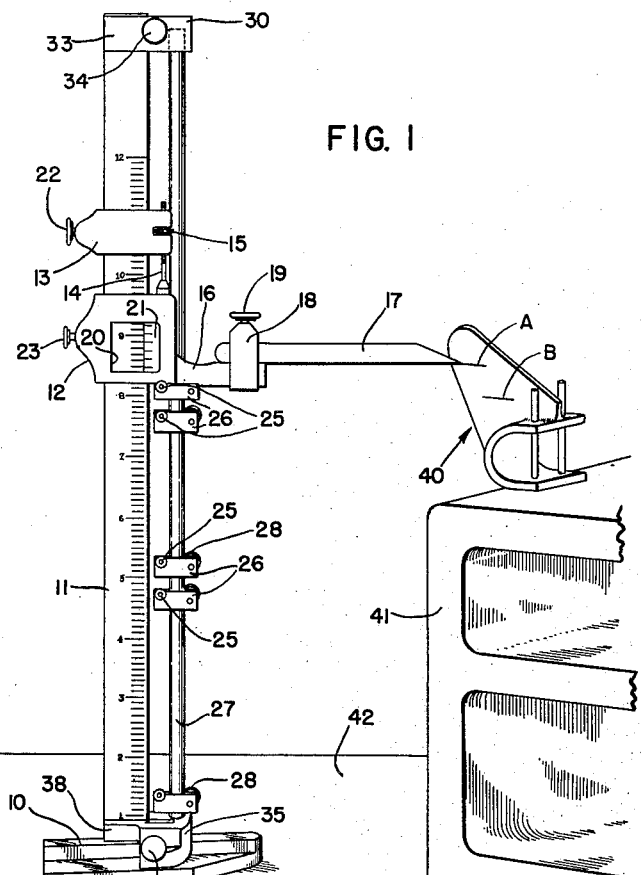
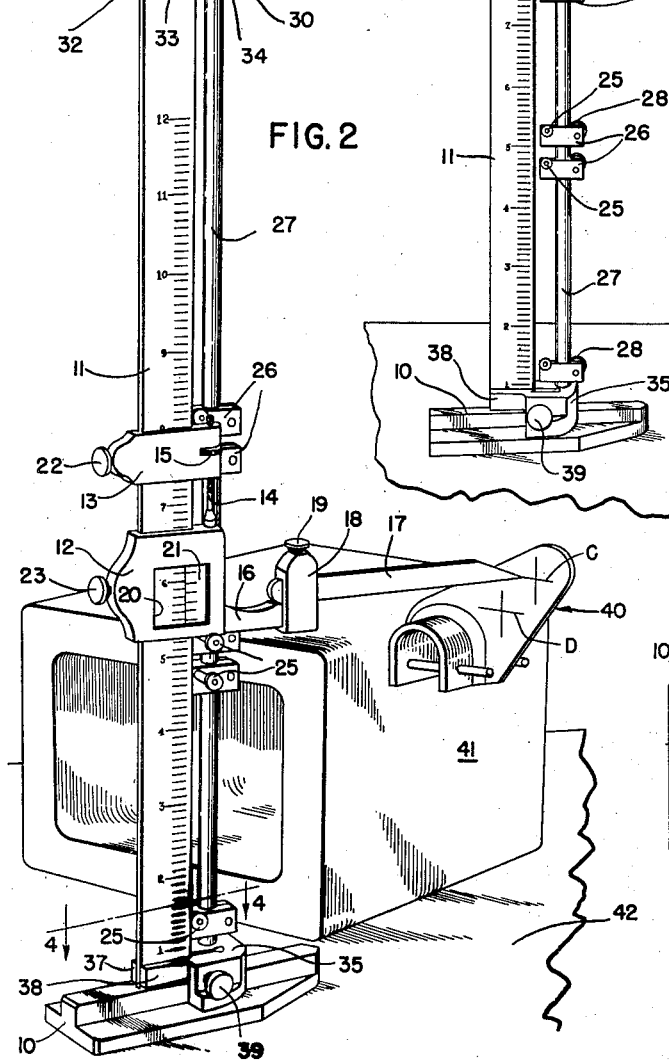
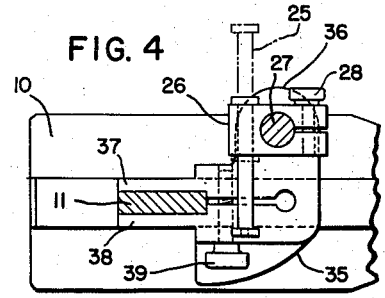
*INVENTOR.*
WILLIAM V. TEDRICK
BY *George F. Goodyear*
     *ATTORNEY*

Patented Aug. 22, 1950

2,519,942

UNITED STATES PATENT OFFICE 2,519,942

ADJUSTABLE STOP ATTACHMENT FOR HEIGHT GAUGES

William V. Tedrick, Reynoldsburg, Ohio, assignor to Curtiss-Wright Corporation, a corporation of Delaware Application February 26, 1945, Serial No. 579,814

6 Claims. (Cl. 33—169)

This invention is directed to measuring instruments and particularly to improvements in connection with height gauges.

It is a principal object of this invention to provide an improved measuring instrument which shall be useful as a layout tool for duplicating one or more measurements quickly and accurately on a series of duplicate objects or parts.

It is also an important object to provide means which, when used in connection with height gauges generally, will materially increase the versatility and utility of such gauges.

A further object resides in the arrangement of adjustable stop means and a carrier for the stop means such that the same may be attached to or removed from the measuring instrument without impairing or requiring any changes or modifications thereof.

These and other objects will be noted during the course of the detailed description of a preferred embodiment of the invention as the same is illustrated in the drawing, in which:

Figure 1 is an elevational assembly view of the measuring instrument showing the features of the invention in connection with a bracket structure requiring the determination of drill hole reference axes, Figure 2 is a perspective view of the instrument illustrating a further stage of its application over the showing of Figure 1, Figure 3 is an enlarged top plan view of a clamping element or attachment device taken at line 3—3 of Figure 2, and Figure 4 is an enlarged but fragmentary view of a second clamping device which is used in cooperation with the device of Figure 3, the view being taken at line 4—4 in Figure 2.

The present invention is illustrated in the accompanying drawing as comprising a height gauge and means for attachment to the gauge whereby the same may be made more versatile and useful. The gauge includes a base plate or pedestal member 10, an upright scale member 11 suitably fixed in the base plate, a vernier type measurement determining slide piece 12 and an adjusting slide piece 13 which is operatively connected to the vernier slide through a threaded adjustment screw shaft 14, the latter being moved in a longitudinal direction by means of a knurled nut 15 fixed in the adjusting slide 13 as shown. The vernier slide piece is formed with a projecting arm 16 to which a pointer element 17 is suitably clamped by element 18 and set screw 19. The arm 16 is adapted to move along a path which is in the plane of the scale member.

The vernier slider is provided with at least one side opening 20 and a beveled scale surface 21 upon which is scribed the vernier scale or indicia. The upright scale member 11 is also provided with scale indicia along at least one of its flat sides such that the vernier scale will be in registry therewith and both scale indicia will be visible through the opening 20 in the usual manner. Thus the slides 12 and 13 are moved together along the scale member 11 until a first or rough location of the pointer 17 is reached. Thereafter, a set screw 22 will serve, when tightened against the adjacent edge of member 11, to fix the adjustment slide and permit fine adjustment of the vernier slide 12 through the threaded shaft 14. A second set screw 23 on vernier slide 12 will serve to fix the latter in the final position desired.

In order that one or more positions of the vernier slide may be relocated quickly and without requiring the use of the adjustment slide and screw shaft 14, there is provided a series of stop elements 25, each of which is movable into or away from the path of movement of arm 16. When located across the path of arm 16 it will be possible to return the vernier slide into its original position, provided the stop element has been set for that condition.

Each of the stop elements 25 is mounted in an adjustable clamp means or slide block 26 and the latter is carried on a guide post or member 27. The clamp means is formed with an aperture to receive the guide post and a split end such that a screw element 28 passing through the split ends (Figure 4) will draw the same together and effect a clamping action on the post. The clamp blocks may be slid along the post 27 to any location desired and secured in place. Thereafter the stop element 25 can be projected into the path of travel of arm 16 on the vernier slider 12 and the latter arrested at the location desired.

The stop means is mounted to the instrument in such a position that the guide post or member 27 is parallel to and set to one side of the plane of the scale member 11. This positionment is maintained by a head bracket 30 which receives the post 27 in an offset arm 31. The bracket is secured to the scale member by means of split clamping fingers 32 and 33 and a clamp screw 34. A foot bracket 35 is formed with a similar offset arm 36 to position the guide post 27 in parallel and in offset relation with respect to scale member 11. The foot bracket is also suitably formed to fit the base plate and to engage the scale member between clamping fingers 37 and 38, these clamping fingers being secured by a clamp screw 39.

The details of the head bracket 30 are clearly indicated in Figure 3 while the foot bracket construction should be evident upon reference to Figures 1, 2 and 4. The stop means are each substantially identical and therefore the plan view details of one thereof has been disclosed in Figure 4. It should be noted that the stop element 25 is provided with an integral flanged head and a removable flanged head so that its assembly can be effected easily and simply.

As an example of its use the present invention has been shown in condition for determining the reference axes of a pair of apertures which are to be drilled in the flanged plate of a bracket structure 40. The bracket is first carefully positioned on a jig block 41 of suitable type and placed upon a working surface or datum plane 42. Dowel pins may be utilized to locate the bracket structure upon the block 41 in the manner shown in Figures 1 and 2. A first bracket or template is used to set the instrument for the required measurements so that the stop means may be spaced along the post 27 at the desired locations. In Figure 1 the upper pair of stop means have been located to reproduce the pointer position corresponding to the horizontal reference axes scribed on the bracket structure at A and B. In Figure 2 the lower pair of stop means have been located to correspond to the horizontal reference axes C and D scribed on the bracket structure after the latter has been rearranged on the datum plane in the manner shown.

For each subsequent bracket structure requiring identical measurements to locate the required axes from which drillings are determined, all that is necessary is to slide the vernier or measurement determining member 12 and its adjustment slide 13 along the scale until the desired stop element 25 can be projected into the path of movement thereof. Upon completion the stop element can be moved out of the way and the sliders moved to a subsequent location.

It should now be apparent that the present invention relates to an improved and novel measuring instrument which has great utility and may be applied in a variety of manners and under varied conditions. Accordingly, it is to be understood that the scope of the invention is to be limited only by the claims hereafter appearing and that the foregoing description is given in an instructive and not in a limiting sense.

What is claimed is:

1. An attachment for a height gage having a base, an upright calibrated scale supported by the base and a scale slide member mounted on the scale for movement therealong to any selected height, said attachment comprising a bar, clamping means at the ends of the bar for detachably connecting it to the height gage adjacent the end portions of the scale for supporting the bar in parallel relation to the scale and spaced laterally from the path of movement of the scale slide member along the scale, a plurality of slide elements mounted on the bar for independent sliding movement therealong, each such slide element having clamping means for releasably securing it to the bar at any selected height along the bar, and a stop pin slidably mounted on each slide element, each such stop pin being slidable axially on the related slide element in a horizontal direction into and out of the path of vertical movement of the scale slide member along the scale.

2. An attachment for a height gage having a base, an upright calibrated scale supported by the base and a scale slide member mounted on the scale for movement therealong to any selected height, said attachment comprising a bar, clamping means at the ends of the bar for detachably connecting it to the height gage adjacent the end portions of the scale for supporting the bar in parallel relation to the scale and spaced laterally from the path of movement of the scale slide member along the scale, a slide element mounted on the bar for sliding movement therealong, said slide element having clamping means for releasably securing it to the bar at any selected height along the bar, and a stop pin slidably mounted on the slide element, said stop pin being slidable axially on the slide element in a horizontal direction into and out of the path of vertical movement of the scale slide member along the scale.

3. An attachment for a height gage having a base, an upright calibrated scale supported by the base and a scale slide member mounted on the scale for movement therealong to any selected height, said attachment comprising a bar, clamping means at the ends of the bar for detachably connecting it to the height gage adjacent the end portions of the scale for supporting the bar in parallel relation to the scale and spaced laterally from the path of movement of the scale slide member along the scale, a plurality of slide elements mounted on the bar for independent sliding movement therealong, each such slide element having means for releasably securing it to the bar at any selected height along the bar, and a stop carried by each slide element, each such stop being movable laterally on the related slide element into and out of the path of movement of the scale slide member along the scale.

4. An attachment for a height gage having a base, an upright calibrated scale supported by the base and a scale slide member mounted on the scale for movement therealong to any selected height, said attachment comprising a bar, clamping means at the ends of the bar for detachably connecting it to the height gage adjacent the end portions of the scale for supporting the bar in parallel relation to the scale and spaced laterally from the path of movement of the scale slide member along the scale, a slide element mounted on the bar for sliding movement therealong, said slide element having means for releasably securing it to the bar at any selected height along the bar, and a stop carried by the slide element, said stop being movable laterally on the slide element into and out of the path of movement of the scale slide member along the scale.

5. Adjustable stop means for a height gage having a base, an upright calibrated scale supported by the base and a scale slide member mounted on the scale for movement therealong to any selected height, said adjustable stop means comprising a bar, laterally extending arms at the ends of the bar connecting it to the height gage adjacent the end portions of the scale, said arms supporting the bar in parallel relation to the scale and spaced laterally from the path of movement of the scale slide member along the scale, a slide element mounted on the bar for sliding movement therealong, said slide element having means for releasably securing it to the bar at any selected height along the bar, and a stop carried by the slide element, said stop being movable laterally on the slide element into and out of the path of movement of the scale slide member along the scale.

6. Adjustable stop means for a height gage having a base, an upright calibrated scale supported by the base and a scale slide member mounted on the scale for movement therealong to any selected height, said adjustable stop means comprising a bar, laterally extending arms at the ends of the bar connecting it to the height gage adjacent the end portions of the scale, said arms supporting the bar in parallel relation to the scale and spaced laterally from the path of movement of the scale slide member along the scale, a slide member mounted on the bar for sliding movement therealong, the last-mentioned slide member having means for releasably securing it to the bar at any selected height along the bar, and a stop carried by one of said slide members, said stop being movable laterally on the slide member which carries it into and out of the path of vertical movement of the other slide member.

WILLIAM V. TEDRICK.

REFERENCES CITED

The following references are of record in the file of this patent:

UNITED STATES PATENTS

| Number | Name | Date |
|---|---|---|
| 515,235 | Lavigne | Feb. 20, 1894 |
| 785,432 | Perkins | Mar. 21, 1905 |
| 961,238 | Joerissen | June 4, 1910 |
| 1,272,997 | Powell | July 16, 1918 |
| 1,928,417 | Foothorap et al. | Sept. 26, 1933 |
| 2,020,193 | Klin | Nov. 5, 1935 |

FOREIGN PATENTS

| Number | Country | Date |
|---|---|---|
| 4,631 | Great Britain | 1901 |